UNITED STATES PATENT OFFICE.

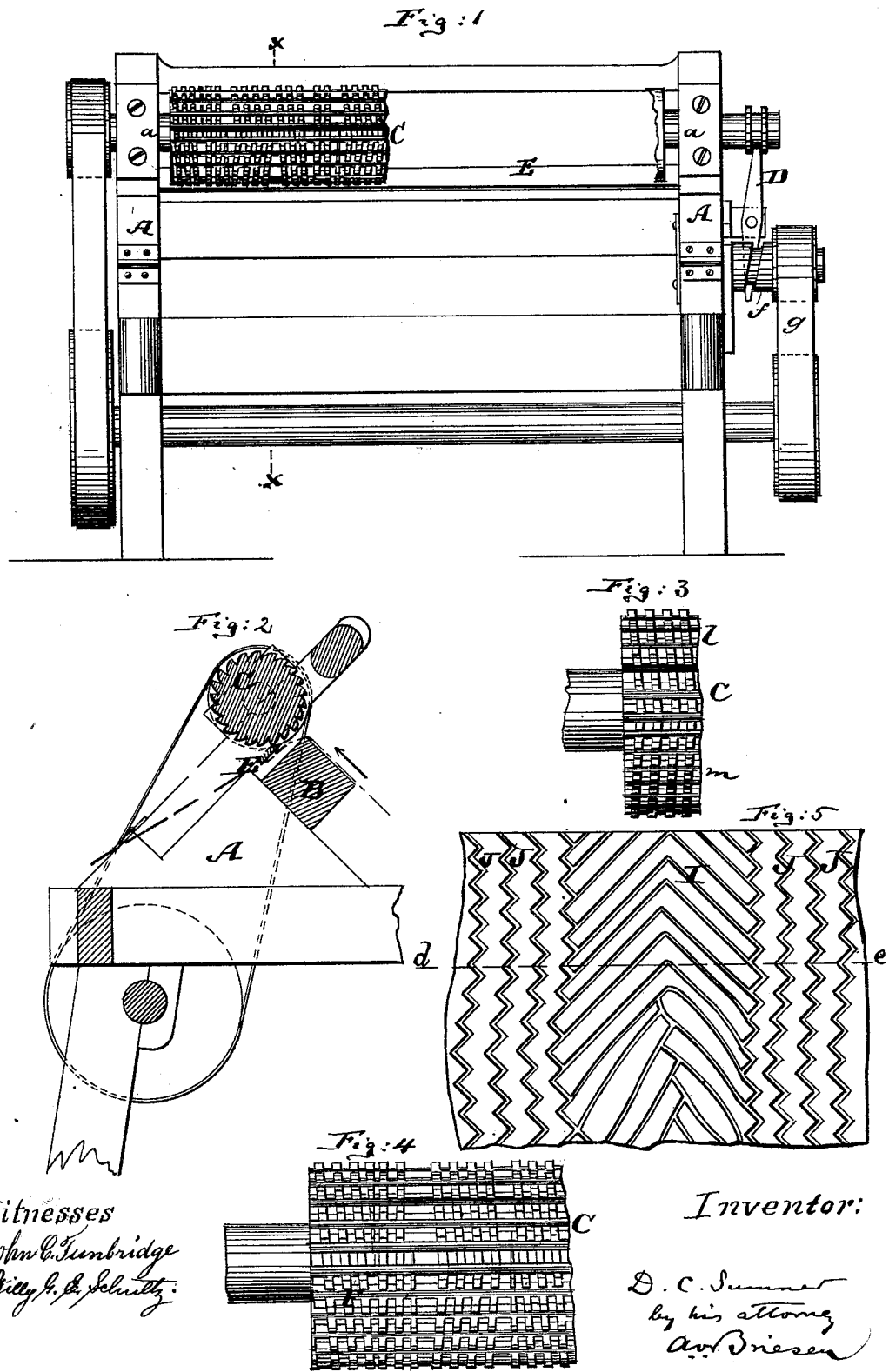

DWIGHT C. SUMNER, OF MILLBURY, MASSACHUSETTS.

CLOTH-SHEARING MACHINE.

SPECIFICATION forming part of Letters Patent No. 229,648, dated July 6, 1880.

Application filed February 21, 1880.

*To all whom it may concern:*

Be it known that I, DWIGHT C. SUMNER, of Millbury, in the county of Worcester and State of Massachusetts, have invented a new and Improved Cloth-Shearing Machine, of which the following is a specification.

My invention relates to improvements in machines for ornamenting the surface of napped or piled fabrics by shearing or cutting out parts of the nap or surface fibers. Machines for this purpose have heretofore been made to form parallel undulating diagonal or herring-bone furrows or depressed lines in the face of the fabric.

My invention consists in placing upon the shearing-cylinder cutting-sections in zigzag order to produce zigzag stripes in direction of the motion of the fabric by simply rotating the cylinder.

The invention also consists in combining the cutting-cylinder, having cutting-sections placed in oblique or zigzag order, with mechanism for imparting to it reciprocating motion while it rotates, thereby producing a greater variety of undulating and apparently irregular furrows than can be produced by the said cylinder if the same were not reciprocated.

In the accompanying drawings, Figure 1 represents an elevation of part of a cloth-shearing machine, showing a portion of my improved cylinder. Fig. 2 is a vertical cross-section of the same, taken on line *x x* of Fig. 1. Fig. 3 is an enlarged side view of a portion of the revolver or blade cylinder having zigzag teeth. Fig. 4 is a similar view of part of a blade-cylinder having zigzag and helical rows of teeth. Fig. 5 represents a specimen of the ornamentations produced by my improved machine.

Referring to the drawings, A represents the frame of the cloth-shearing machine; B, the cloth-rest; C, the revolver or blade cylinder, supported by journals *a* in the frame A. Reciprocating movement may be given to the cylinder C by a cam-lever, D, or other suitable device, at the same time that said cylinder is rotated by a belt or other means. E represents the ledger-blade. The cam-lever D is oscillated by a cam, *f*, having a cam-groove in which a pin on the lever engages, the cam being rotated by a belt, *g*, or otherwise.

Heretofore the cylinder had vertical rings of teeth, and could be reciprocated as in my Patent No. 203,388, thereby producing, in combination with a notched ledger-blade, alternate straight and undulating stripes, and cylinders having teeth arranged in helical order, as at F in Fig. 4, were also shown in my Patent No. 216,984; but such cylinder was not combined with mechanism for reciprocating it.

In my present invention I dispense with the notching of the ledger-blade and furnish it with a straight continuous cutting-edge, as shown in Fig. 1, and provide the revolver blade-cylinder with isolated cutting-sections arranged around the cylinder in oblique order, as shown in Fig. 1, and on an enlarged scale in Figs. 3 and 4, and combine such a cylinder with mechanism for imparting to it reciprocating motion. I thus produce irregular patterns or styles of ornamentation.

Another part of my invention consists in placing the teeth upon the cylinder in zigzag order, as in Fig. 3. This cylinder will, when not reciprocated, be capable of producing continuous zigzag stripes over a smooth-edged ledger-blade, the stripes being in the direction of the motion of the fabric.

The cutting-sections shown in Fig. 3 are, as stated, arranged in zigzag order, one part of the circumference of the cylinder having the sections *l* arranged in a right-hand spiral or oblique order and the other half having them in a left-hand spiral or oblique order, *m*.

The operation of the cylinder or revolver, when thus constructed, is as follows: If the cylinder be revolved against the straight cutting-edge of the ledger-blade E without reciprocating longitudinally on its bearings, the spiral sections F, Fig. 4, will produce in the surface of the fabric operated upon diagonal or herring-bone grooves or furrows I, Fig. 5, while the zigzag sections *l m* of the cylinder will produce continuous zigzag grooves or furrows J in the direction of the motion of the fabric.

When, however, in addition, the cylinder C is reciprocated the effect is to give to the zigzag and herring-bone grooves or furrows 1 J a peculiar undulating or apparently irregular arrangement, as shown in Fig. 5, below the line *d e*.

I desire it understood that I regard as novel in this machine only the zigzag order of cutting-sections, as shown in Fig. 3, and the cylinder having overlapping helical, or partly helical, rows of isolated cutting-sections combined with reciprocating mechanism.

The course of the fabric through the machine is indicated by dotted lines and arrow in Fig. 2.

I claim—

1. In a cloth-shearing machine, the revolver or blade cylinder C, having isolated cutting-sections developed around it in circumferentially different or partially different vertical planes, in combination with the straight ledger-blade E, and with mechanism D for reciprocating said revolver, substantially as described.

2. In a cloth-shearing machine, the revolver or blade cylinder having isolated cutting-sections *l m* arranged in zigzag order, in combination with a ledger-blade and cloth-rest to produce zigzag furrows J in the direction of the motion of the fabric, substantially as described.

DWIGHT CLINTON SUMNER.

Witnesses:
HARRY M. GODDARD,
IRA N. GODDARD.